United States Patent [19]

Crisp

[11] Patent Number: 4,900,087
[45] Date of Patent: Feb. 13, 1990

[54] AUTOMOBILE SEAT WITH BUILT IN CHILD SEAT

[76] Inventor: Nadine Z. Crisp, P.O. Box 301, Seymour, Mo. 65746

[21] Appl. No.: 337,382

[22] Filed: Apr. 13, 1989

Related U.S. Application Data

[63] Continuation-in-part of Ser. No. 147,502, Jan. 25, 1988, abandoned.

[51] Int. Cl.⁴ ............................................. A47C 15/00
[52] U.S. Cl. .................................... 297/238; 297/117; 297/112; 297/256
[58] Field of Search ............... 297/238, 254, 255, 256, 297/234, 250, 112, 113, 235, 236, 428, 418, 117

[56] References Cited

U.S. PATENT DOCUMENTS

| | | | |
|---|---|---|---|
| 281,410 | 7/1883 | Sleicher | 297/236 X |
| 1,321,009 | 11/1919 | Carlson | 297/236 |
| 1,358,041 | 11/1920 | Vetter | 297/236 X |
| 1,641,953 | 9/1927 | Abraham | 297/108 |
| 1,787,510 | 1/1931 | Case et al. | 297/428 |
| 3,556,589 | 1/1971 | Messier | 297/254 X |
| 4,518,203 | 5/1985 | White | 297/108 X |
| 4,540,216 | 9/1985 | Hassel, Sr. | 297/238 |
| 4,541,654 | 9/1985 | Jonasson | 297/238 X |
| 4,690,455 | 9/1987 | Bailey et al. | 297/238 |
| 4,756,573 | 7/1988 | Simin et al. | 297/238 X |

Primary Examiner—Kenneth J. Dorner
Assistant Examiner—José V. Chen
Attorney, Agent, or Firm—Kokjer, Kircher, Bradley, Wharton, Bowman & Johnson

[57] ABSTRACT

An automobile seat having a built in child seat that assumes different positions to accommodate infants in a rearwardly facing position and children in a forwardly facing position. The child seat unit includes a back panel which is secured to the adult seat back and a pair of hinged seat panels. In a storage position, the seat panels are folded up to cover the back panel with cushion sides of the seat panels facing forwardly to provide cushions on the adult seat back. The seat panels can be folded downwardly with one horizontal and the other inclined to receive an infant on a padded insert applied to the inclined panel. When used as a child seat, the two seat panels are folded on top of one another with the cushion side of the top panel facing upwardly to provide the seat surface. A removable carrying handle can be provided to allow the seat to function as a child carrier when removed from the automobile seat.

20 Claims, 3 Drawing Sheets

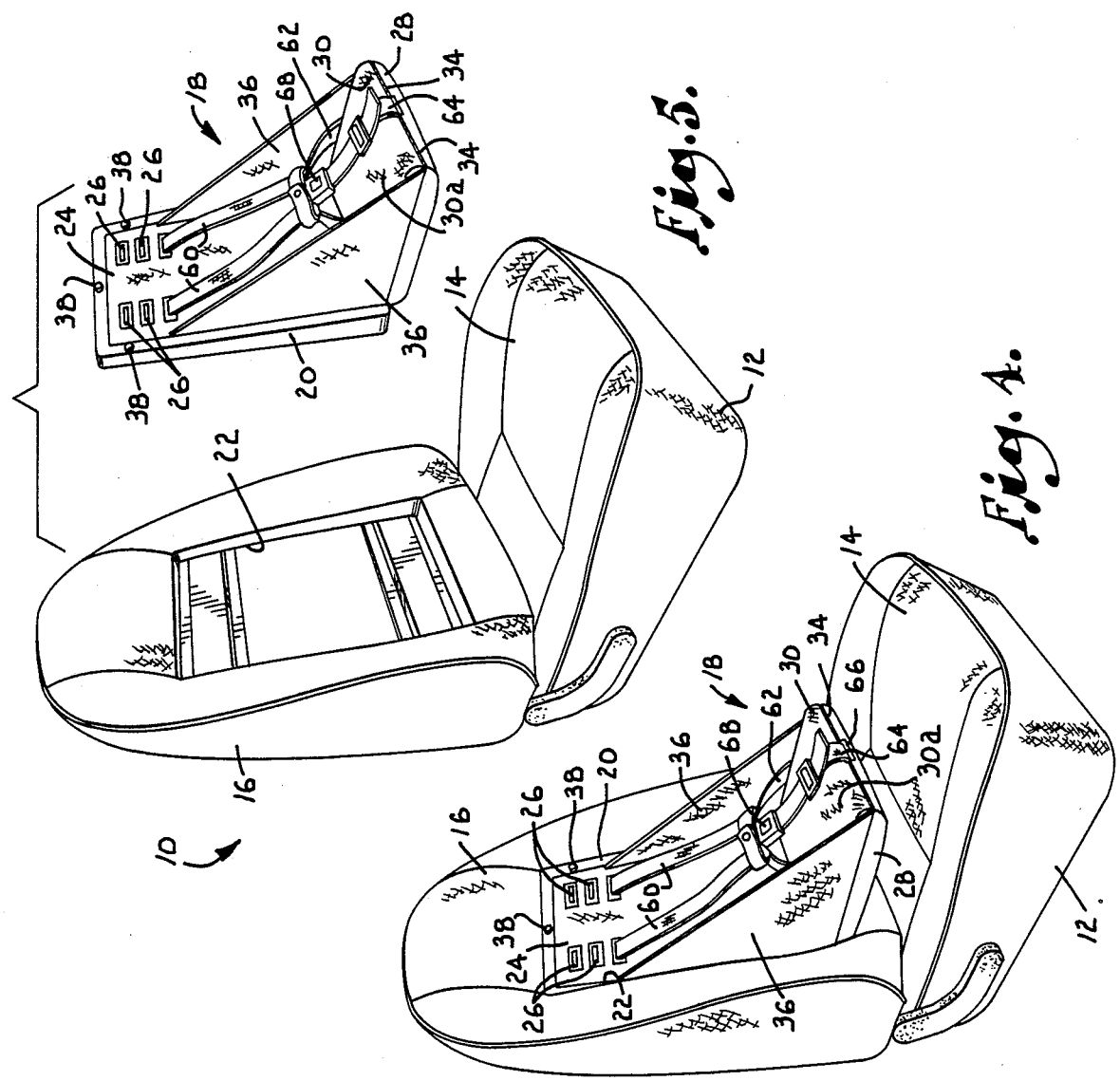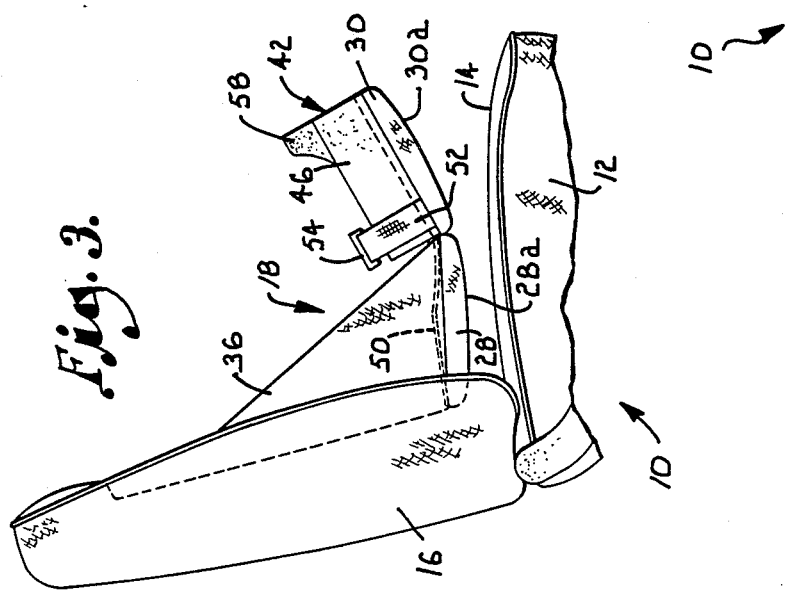

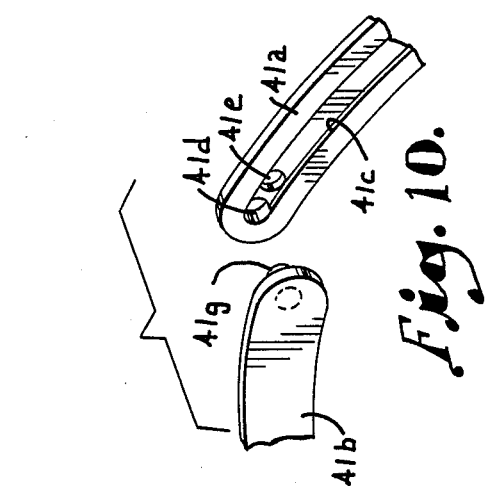
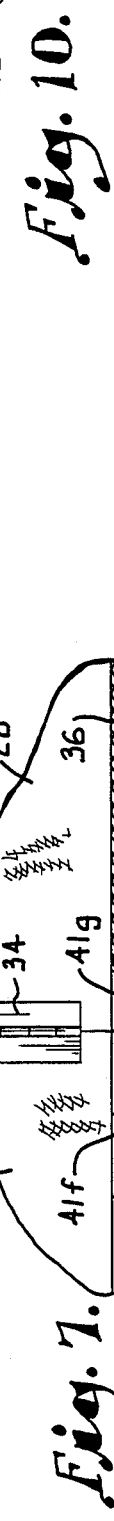
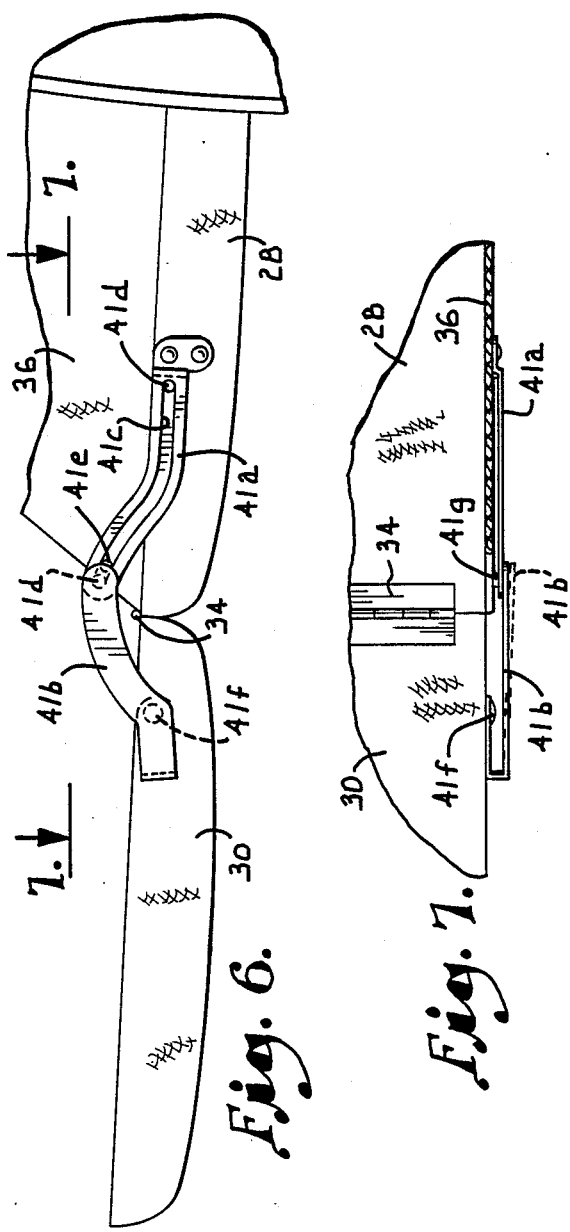
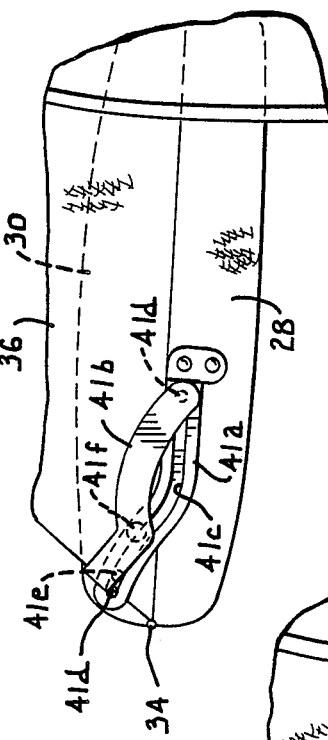
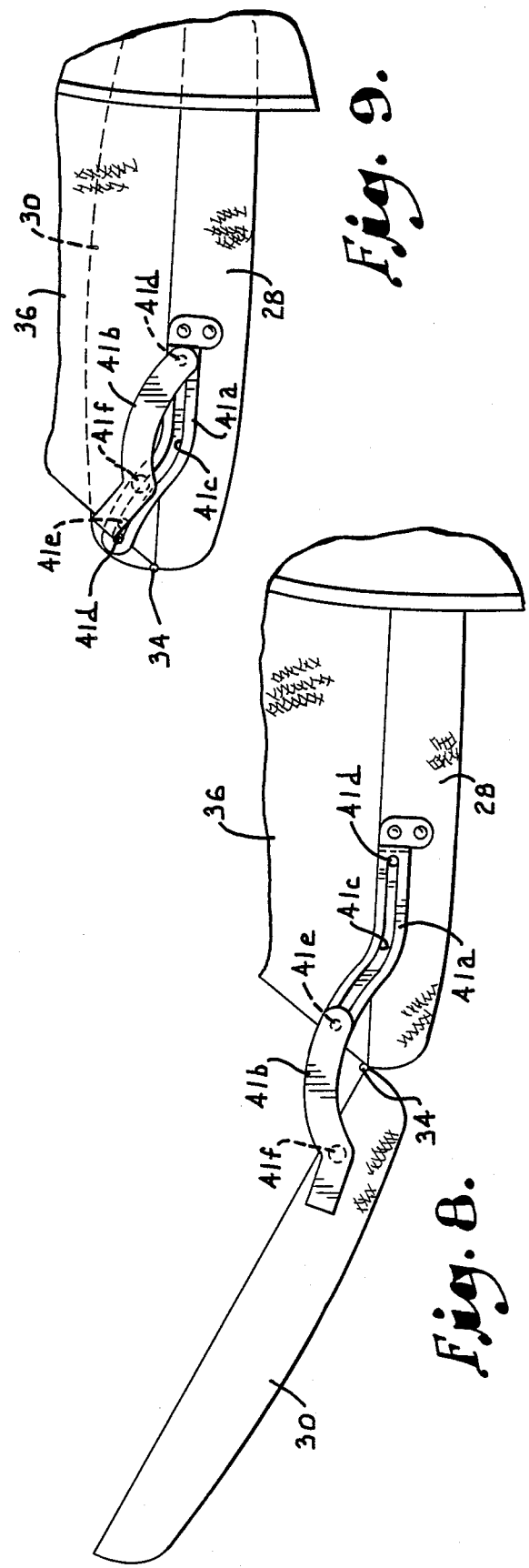

AUTOMOBILE SEAT WITH BUILT IN CHILD SEAT

BACKGROUND AND SUMMARY OF THE INVENTION

This is a continuation-in-part of my pending application, Ser. No. 147,502, filed on Jan. 25, 1988 now abandoned.

This invention relates generally to vehicle seats and more particularly to an ordinary automobile passenger seat having a retractable built in child seat In accordance with the invention, a child seat unit includes a back panel which is bolted or otherwise secured to the back rest part of an automobile passenger seat. A pair of seat panels are hinged to one another and to the back panel of the child seat unit. The seat panels have cushioned sides for cushioning the back of the adult seat when the seat panels are folded up in a storage position to permit the seat to function as an ordinary passenger seat.

The seat panels may also be folded down and over on one another to provide a child seat. The cushion side of one panel faces upwardly to provide the seat surface for the child seat, and flexible fabric sides hold the seat surface in a horizontal position above the adult seat so that the child has leg room for bending his knees and dangling his lower legs. In the folded up storage position, the flexible sides are enclosed within the seat back. The child seat unit is equipped with a safety belt having a shoulder harness, a lap belt and a strap for extension between the legs.

The seat unit has a third position for holding infant in a rearwardly facing position. Then, one seat panel serves as the seat and the other is inclined to serve as a back rest. A padded insert may be snapped onto the inclined panel to cushion the infant's back and torso and provide a belt for securing him in place on the padded insert. A moisture resistant apron extends from the insert to cover the seat area.

It is a feature of the invention that the same snap fasteners which hold the apron in place are used to secure the seat panels in the folded up storage position. Additionally, the back panel of the seat unit may be released from the adult seat, and the seat unit can then function as a child carrier. As a consequence, the present invention not only eliminates the need for a separate child seat but also eliminates the need for a separate child carrier.

DESCRIPTION OF THE DRAWINGS

In the accompanying drawings which form a part of the specification and are to be read in conjunction therewith and in which like reference numerals are used to indicate like parts in the various views:

FIG. 3 is a side elevational view of the seat in the position shown in FIG. 2, with the padded insert in place on one of the seat panels;

FIG. 4 is a perspective view similar to FIGS. 1 and 2 but showing the child seat unit folded in a position to receive a child in the forwardly facing position;

FIG. 5 is a perspective view similar to FIG. 4 but showing the child seat unit removed from the adult seat;

FIG. 6 is a fragmentary side elevational view on an enlarged scale showing the child seat unit completely unfolded with the two seat panels coplanar with one another and both in a horizontal orientation;

FIG. 7 is a fragmentary top plan view taken generally along line 7—7 of FIG. 6 in the direction of the arrows;

FIG. 8 is a fragmentary side elevational view similar to FIG. 6 but showing one of the seat panels in an inclined position similar to that of FIG. 2;

FIG. 9 is a fragmentary side elevational view similar to FIGS. 6 and 8 but showing the child seat unit folded in a position similar to that of FIG. 4 to receive a child in the forwardly facing position; and FIG. 10 is a fragmentary exploded perspective view on an enlarged scale showing the mating components of the latch device of the child seat unit.

DETAILED DESCRIPTION OF THE INVENTION

Figure 1:
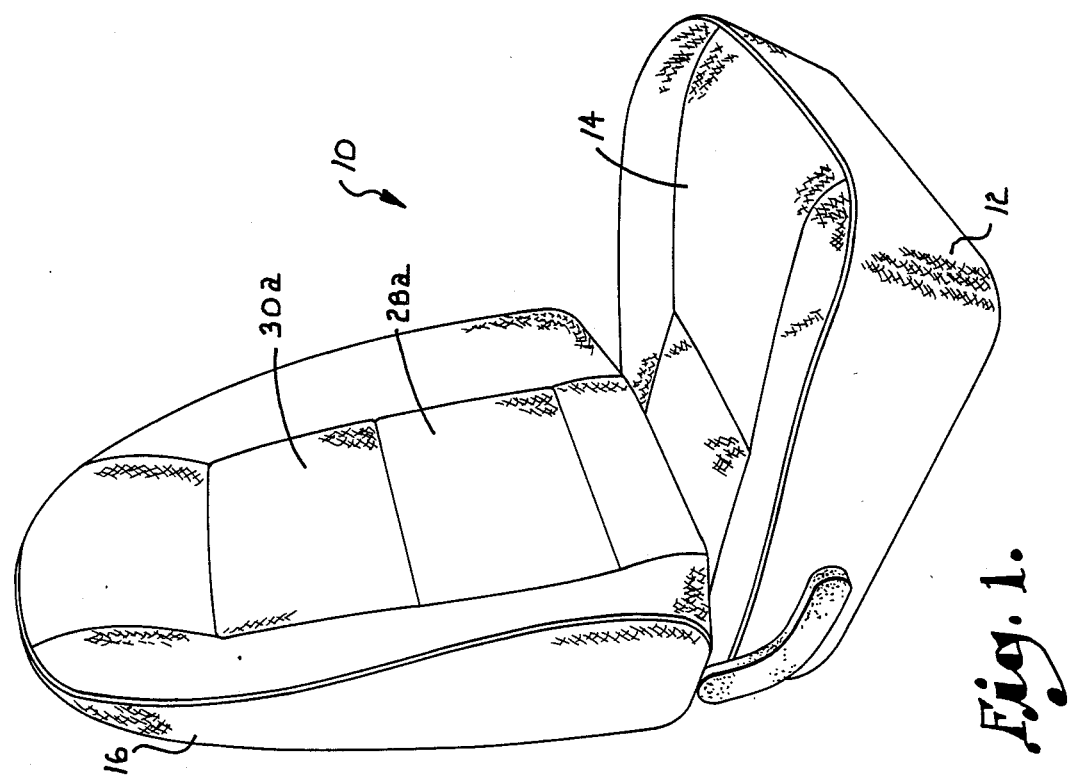
FIG. 1 is a perspective view of an automobile passenger seat equipped with a child seat unit constructed according to a preferred embodiment of the present invention, with the child seat unit folded up in the storage position.

Referring now to the drawings in more detail and initially to FIG. 1, numeral 10 generally designates a passenger seat of the type that may be installed in an automobile or other vehicle. The automobile seat includes a seat portion 12 having an upwardly facing seat surface 14 which should be cushioned. A seat back 16 extends generally upwardly from the seat portion 12 in order to provide a cushioned back rest for a passenger seated on the seating surface 14.

In accordance with the present invention, a child seat unit which is generally identified by numeral 18 is built into the automobile seat 10. The child seat unit 18 includes a rectangular back panel 20 which fits closely in a rectangular recess or cavity 22 formed in the seat back 16. The back panel 20 has a padded front surface 24 which provides a back rest for a child seated on the seat unit, as will be explained more fully. A plurality of shoulder strap slots 26 are formed through the back panel 20. The back panel 20 may be rigidly secured to the frame of the seat back 18 by bolts or other suitable fasteners (not shown) which are releaseable so that the back panel 20 may be removed from the seat back 16 when desired.

The child seat unit also includes a pair of substantially square seat panels 28 and 30. The first panel 28 has one edge pivotally secured to the lower edge of the back panel 20 by hinges 32. The hinge axis provided by the hinges 32 is horizontal. The second panel 30 has one edge pivotally secured to the forward or outer edge of panel 28 by a pair of hinges 34. The hinges 34 provide a hinge axis for panel 30 which is parallel to the axis provided by hinges 32.

A pair of triangular sides 36 extend between the back panel 20 and the first seat panel 28. One edge of each side 36 is connected with the back panel 20 near its side edge, while another edge of each side 36 connects with panel 28 near its side edge. The sides 36 are flexible and may be constructed of a fabric or another suitable material which exhibits the necessary strength and flexibility.

By virtue of the pivotal connections provided by the hinges 32 and 34, panels 28 and 30 may assume three different positions. In the storage position shown in FIG. 1, both panels 28 and 30 are folded up flatly against and completely cover the back panel 20. In this position, the two panels 28 and 30 occupy a common vertical plane and the flexible sides 36 are enclosed between the back panel 20 and the seat panels 28 and 30. Snap fasteners 38 are provided on the back panel 20 to mate with complimentary snap fasteners 40 which are formed on panel 30. The fit between the snap fasteners 38 and 40 secures the seat panels 28 and 30 in the storage position while permitting the seat panels to be folded downwardly to their other functional positions.

Panels 28 and 30 have cushion surfaces 28a and 30a, respectively, which face forwardly and form cushions on the seat back 16 in the storage position. The cushion surfaces 28a and 30a are complimentary in style and texture to the surrounding cushions on the seat back 16 in order to provide an attractive appearance for the seat in the storage position. A passenger can be seated on the automobile seat 10 in the normal manner when the child seat unit is in its storage position.

Figure 2:
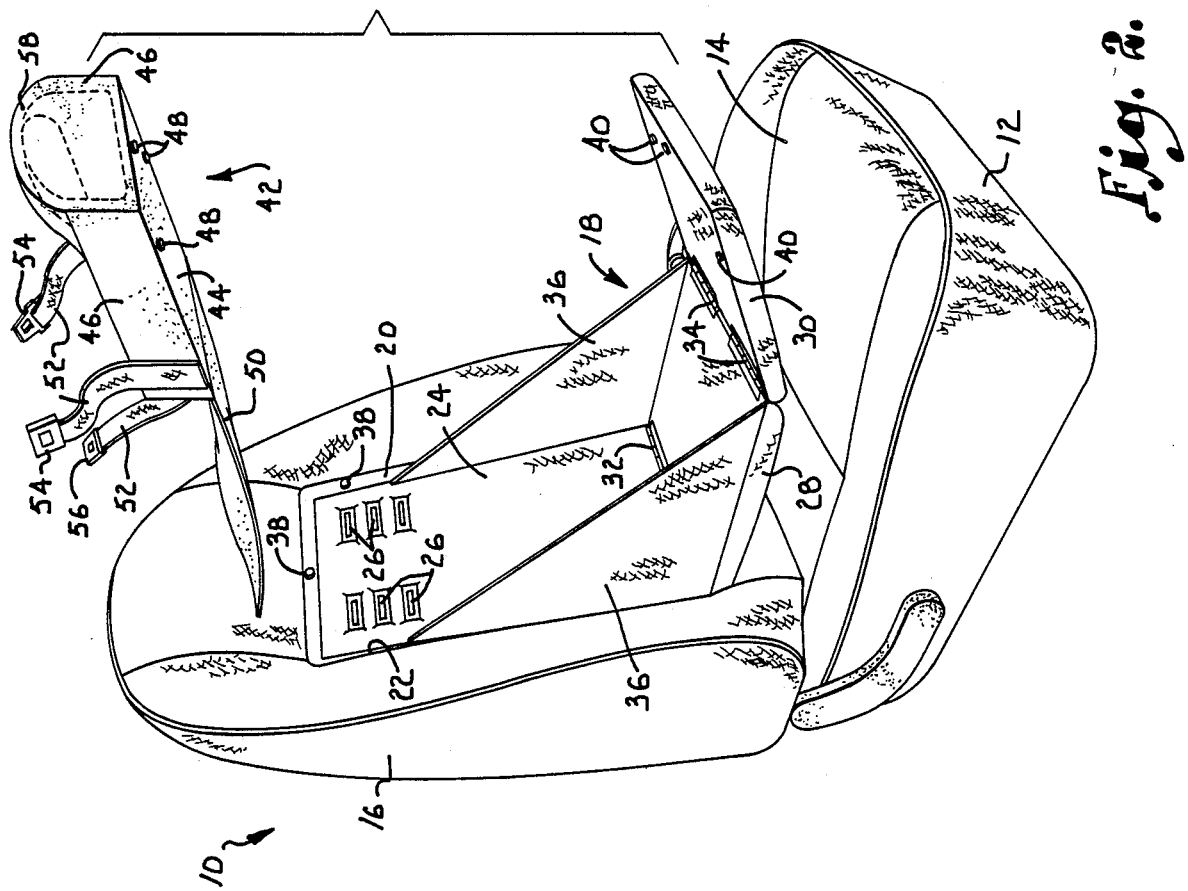
FIG. 2 is a perspective view similar to FIG. 1 but showing the child seat unit in a position to receive an infant in a rearwardly facing position, with a padded insert shown exploded away from the child seat unit.

FIG. 2 depicts another position of the seat panels 28 and 30, and the seat unit 18 is arranged in this position to receive an infant facing rearwardly. Panel 28 extends forwardly from the bottom of the back panel 24 and is held in a substantially horizontal position by the fabric sides 36. Panel 28 is spaced above the seating surface 14. The second panel 30 extends forwardly and upwardly from the forward or outer edge of panel 28 at an incline to provide an inclined back rest for the infant on the seat unit. A suitable catch or latching mechanism holds panel 30 in the inclined position and yet releases to permit it to be folded to its other positions. The surfaces of panels 28 and 30 opposite the cushion sides 28a and 30a face generally upwardly in this position of the seat unit.

The latch mechanism is shown in FIGS. 6-10 and includes mating latch components 41a and 41b. Component 41a is secured to panel 28 and includes a groove 41c having spaced apart openings 41d at its opposite ends and at least one other opening 41e between the end openings 41d. Component 41b is pivoted at 41f to panel 30 and includes on one end a projecting pin 41g having a size to ride in the groove 41c and to fit removably in the openings 41d and 41e. When pin 41g is in the opening 41d on the outer end of component 41a, the seat panels 28 and 30 are latched in the position of FIG. 6. When pin 41g is in the other opening 41d, the panels are locked in the position of FIG. 9. When pin 41g is in opening 41e, panel 30 is latched in the inclined position of FIG. 8 where it serves as a back rest for an infant facing rearwardly in the child seat unit.

A padded insert which is generally identified by reference number 42 is installed on the seat unit 18 to provide padding for the infant. The insert 42 is generally U-shaped and includes a bottom panel 44 and opposite sides 46, all of which are suitably padded to provide a cushioning effect to an infant resting on the insert. Snap fasteners 48 are provided on the underside of the bottom panel 44 and mate with the snap fasteners 40 on panel 30 in order to hold insert 42 in place on the seat unit. The bottom panel 44 occupies the surface of panel 30, while a moisture resistant apron 50 extends from the insert and substantially covers the top surface of panel 28. The apron prevents moisture and other messes from damaging panel 28. Three straps 52 are provided on the insert 42 and serve to hold the infant in place. Two of the straps extend over the torso of the infant and may be secured by mating buckle type fasteners. The third strap extends between the legs of the infant and carries a fastener 56 which may be connected with one of the fasteners 54. The insert 42 may also be equipped with a head restraint 58.

The third position of the seat unit 18 is illustrated in FIG. 4. In this position, panel 28 assumes the same position as in the infant seat position. However, the other seat panel 30 is folded such that it lies directly on top of panel 28. The cushion side 30a then faces upwardly to provide a cushioned seat surface for a child seated on the seat unit 18 and facing forwardly. It is noted that the two panels 28 and 30 are spaced above the seat portion 12 of the automobile seat so that the child has sufficient room to bend his legs downwardly at the knees over the edge of panel 30. A safety belt arrangement includes a pair of shoulder straps 60 which may be extended through and suitably secured in the belt slots 26 formed in the back panel 24. The safety belt also includes a lap belt 62 and a strap 64 for extension between the legs of the child. Strap 64 extends through and is suitably secured in a slot 66 formed between the two hinges 34 which connect panels 28 and 30. The straps in the safety belt are connected together by belt type fasteners 68.

In use, the seat 10 can function as an ordinary automobile passenger seat in the storage position of the child seat unit shown in FIG. 1. The cushioned sides 28a and 30a face forwardly to form part of the adult seat back 16. The mating snap fasteners 38 and 40 hold panels 28 and 30 in the storage position.

If an infant is to be seated in the child seat unit, panels 28 and 30 are folded downwardly to the infant seat position (FIGS. 2 and 3), and the insert 42 is applied to panel 30. An infant can then be placed on panel 28 with his back and torso received on the bottom panel 44 of the insert between the opposite sides 46. The fabric sides 36 maintain panel 28 in a horizontal position for support of the infant, while the straps 52 secure him in place in the insert.

If an older child is to be seated in the seat unit, insert 42 is removed and panels 28 and 30 are folded to the position shown in FIG. 4. Then, a child may be seated on the cushion side 30a of the second seat panel with his back against the cushion 24 on the front surface of the back panel 20. The sides 36 restrict movement of the child to the sides and the safety belt secures him in place in the seat unit facing forwardly.

The seat unit 18 may also be used separately from the automobile seat 10 as a baby carrier. This is accomplished by removing the bolts or other fasteners which hold the back panel 20 on the seat back 16, thus releasing panel 20 and the entire child seat unit, as indicated in FIG. 5. A child may be carried in the detached seat unit which then functions as a child carrier. A suitable handle (not shown) may be provided on the seat unit when it is to serve as a child carrier. The handle may be a molded plastic snap-on unit.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. In a motor vehicle seat having a seating surface and a seat back, the improvement comprising:

first and second panels each having a cushion side and an opposite side;

first hinge means connecting said panels to the seat back;

second hinge means connecting said panels to one another, said first and second hinge means mounting the first and second panels for hinged movement between a first position wherein the panels are arranged one above the other in a common plane extending along the seat back with said cushion sides facing forwardly to provide a cushion on the seat back, and a second position wherein the panels are arranged with said opposite sides against one another and extend forwardly from the seat back each in substantially horizontal orientation spaced above the seating surface with said cushion surface of the second panel facing upwardly to provide a child seat surface for receiving a child thereon;

a pair of flexible sides extending from opposite sides of the child seat surface and acting to hold said panels in the second position; and releasable belt means for restraining a child seated on the child seat surface.

2. The improvement of claim 1, including a back panel secured to the seat back, said first hinge means connecting said first panel with said second back panel.

3. The improvement of claim 2, wherein said first and second panels each have opposite edges and wherein:

said first hinge means provides a first hinge axis connecting one edge of said first panel with said back panel; and said second hinge means provides a second hinge axis connecting the opposite edge of said first panel with one edge of said second panel.

4. The improvement of claim 2, wherein said back panel is secured to the seat back in a manner permitting removal of the back panel from the seat back, whereby the back panel and said first and second panels cooperate to provide a child carrier in the second position of the panels.

5. The improvement of claim 1, wherein said first and second hinge means allow movement of said panels to a third position wherein the first panel extends from the seat back in a generally horizontal orientation and the second panel extends from the first panel at an incline to provide an inclined back support for an infant on the first panel facing rearwardly, and including releasable means for retaining said panels in the third position.

6. The improvement of claim 5, including a padded insert removably applicable to said second panel in the third position to provide padding for the infant.

7. The improvement of claim 6, including mating snap means on the insert and the second panel for securing the insert to the second panel.

8. The improvement of claim 7, including snap means on the seat back for mating with the snap means on said second panel to secure the panels in said first position.

9. The improvement of claim 6, including belt means on said insert for securing the infant thereto.

10. The improvement of claim 6, including a moisture resistant apron extending from the insert and substantially covering said first panel when the insert is applied to the second panel.

11. In combination with a motor vehicle seat having a seating surface and a seat back, a child seat unit comprising:

a first seat panel having a cushion side and an opposite side and opposite side edges and first hinge means for connecting said first seat panel with the seat back for pivotal movement about a substantially horizontal hinge axis between a first position wherein the first seat panel has a generally vertical orientation with said cushion side facing forwardly on the seat back, and a second position wherein the first seat panel has a generally horizontal orientation with said cushion side facing downwardly;

a second seat panel having a cushion side and an opposite side and second hinge means for connecting said second seat panel with said first seat panel for pivotal movement between a first position wherein the second seat panel is located above and in a common plane with said first panel with the cushion side of the second panel facing forwardly on the seat back, and a second position wherein the second seat panel overlies the first seat panel with said cushion surface of the second panel facing upwardly to provide a seat surface for a child facing forwardly in the child seat unit;

said second hinge means permitting said second seat panel to assume a third position wherein the second panel inclines from back to front to provide a back surface for a child sitting on said first panel and facing rearwardly;

releasable means for retaining said second seat panel in the third position;

a padded insert removably applicable to said opposite side of the second seat panel in the third position thereof to provide padding for a child facing rearwardly in the child seat unit; and a pair of flexible sides connected with the seat back and with the opposite edges of said first seat panel, said flexible sides holding the first seat panel in its second position and being enclosed behind the first and second seat panels in their first position.

12. The child seat unit of claim 11, wherein said insert includes a padded base applicable to the second seat panel and a pair of padded sides extending from the base to confine the child between said padded sides.

13. The child seat of claim 12, including safety belt means on said insert for holding the child therein.

14. The child seat unit of claim 12, including releasable fasteners on the insert and said second panel mating together to hold the insert on the second panel.

15. The child seat unit of claim 14, including:

a back panel of the child seat unit mounted on the seat back; and releaseable fasteners on said back panel mating with the fasteners on said second panel to hold the first and second panels in their first positions.

16. The child seat unit of claim 11, including a back panel of the child seat unit removably applicable to the seat back, said first hinge means connecting said first panel to said back panel to permit the child seat unit to serve as a child carrier when the back panel is removed from the seat back and said first and second panels are in their second positions.

17. In a motor vehicle having a seating surface and a seat back, the improvement comprising:

a back panel removably applicable to the seat back;

first and second panels each having a cushion side, first hinge means for connecting said seat panels to the back panel and second hinge means for connecting said seat panels to one another, said first and second hinge means mounting said seat panels for pivotal movement between a first position wherein the seat panels substantially cover said back panel with said cushion sides facing forwardly to cushion the seat back, a second position wherein the second panel overlies the first panel with said cushion surface of the second panel facing upwardly and extending forwardly from the back panel to provide a seat surface for a child sitting on the second panel and facing forwardly, and a third position wherein the first panel has a substantially horizontal orientation and the second panel extends from the first panel at an incline to support the back of an infant sitting on the first panel and facing rearwardly;

releasable means for retaining said seat panels in the third position;

opposite sides extending between the first seat panel and the back panel; and said back panel being removable from the seat back to permit the back panel and the first and second seat panels to cooperate in the second position thereof to provide a portable child carrier.

18. The improvement of claim 17, including a padded insert removably applicable to said second panel in the third position to cushion the infant.

19. The improvement of claim 18, including a water resistant apron extending from said insert for covering the first panel in the third position.

20. The improvement of claim 17, wherein said opposite sides are flexible and are covered by the first and second panels in the first position.

* * * * *